United States Patent [19]
Britton

[11] Patent Number: 5,745,849
[45] Date of Patent: Apr. 28, 1998

[54] COMBINATION CORDLESS TELEPHONE AND PREMISE-MONITORING ALARM SYSTEM

[75] Inventor: Rick A. Britton, Springfield, Mo.

[73] Assignee: Digital Monitoring Products, Inc., Springfield, Mo.

[21] Appl. No.: 599,023

[22] Filed: Feb. 9, 1996

[51] Int. Cl.[6] ................................................ H04Q 7/20
[52] U.S. Cl. ...................... 455/404; 379/37; 379/39; 379/40; 379/33
[58] Field of Search ................. 379/40, 43, 41, 379/37, 39, 50, 33, 45, 38, 48; 340/507, 506, 538, 539, 531, 505; 455/404, 166.2

[56] References Cited

U.S. PATENT DOCUMENTS

| | | | |
|---|---|---|---|
| 4,371,751 | 2/1983 | Hilligoss, Jr. et al. | 179/5 |
| 4,791,658 | 12/1988 | Simon et al. | 379/41 |
| 4,825,457 | 4/1989 | Lebowitz | 379/40 |
| 5,140,308 | 8/1992 | Tanaka | 340/539 |
| 5,146,486 | 9/1992 | Lebowitz | 379/40 |
| 5,231,657 | 7/1993 | Umemoto et al. | 379/61 |
| 5,337,342 | 8/1994 | Kruger et al. | 379/40 |
| 5,353,329 | 10/1994 | Hayashi | 379/58 |
| 5,365,568 | 11/1994 | Gilbert | 379/43 |
| 5,454,024 | 9/1995 | Lebowitz | 379/40 |

*Primary Examiner*—William Cumming
*Attorney, Agent, or Firm*—Jonathan A. Bay

[57] ABSTRACT

A combination cordless telephone and premise-monitoring alarm system has a base unit, a cordless handset, and one or more remote alarm detectors. The alarm detectors can be generally either smoke detectors, motion detectors, or open-entry detectors. The base unit includes at least one interface for the public telephone network, and another interface for radio communication with the cordless handset. The base unit preferably also communicates with the remote alarm sensors across the same radio interface. The base unit includes telephone call circuitry to relay telephone calls between the public telephone network and the handset. The base unit also includes alarm processing circuitry to send an alarm warning to a central alarm-monitoring station in response to an alarm signal from a remote detector. The base unit has control circuitry that is configured such that if, during a telephone call, the base unit is given an alarm signal, the base unit will either (i) hang up the telephone call and call up the central alarm-monitoring station to give warning, or (ii) call up the central alarm-monitoring station on a second telephone line (if available).

19 Claims, 4 Drawing Sheets

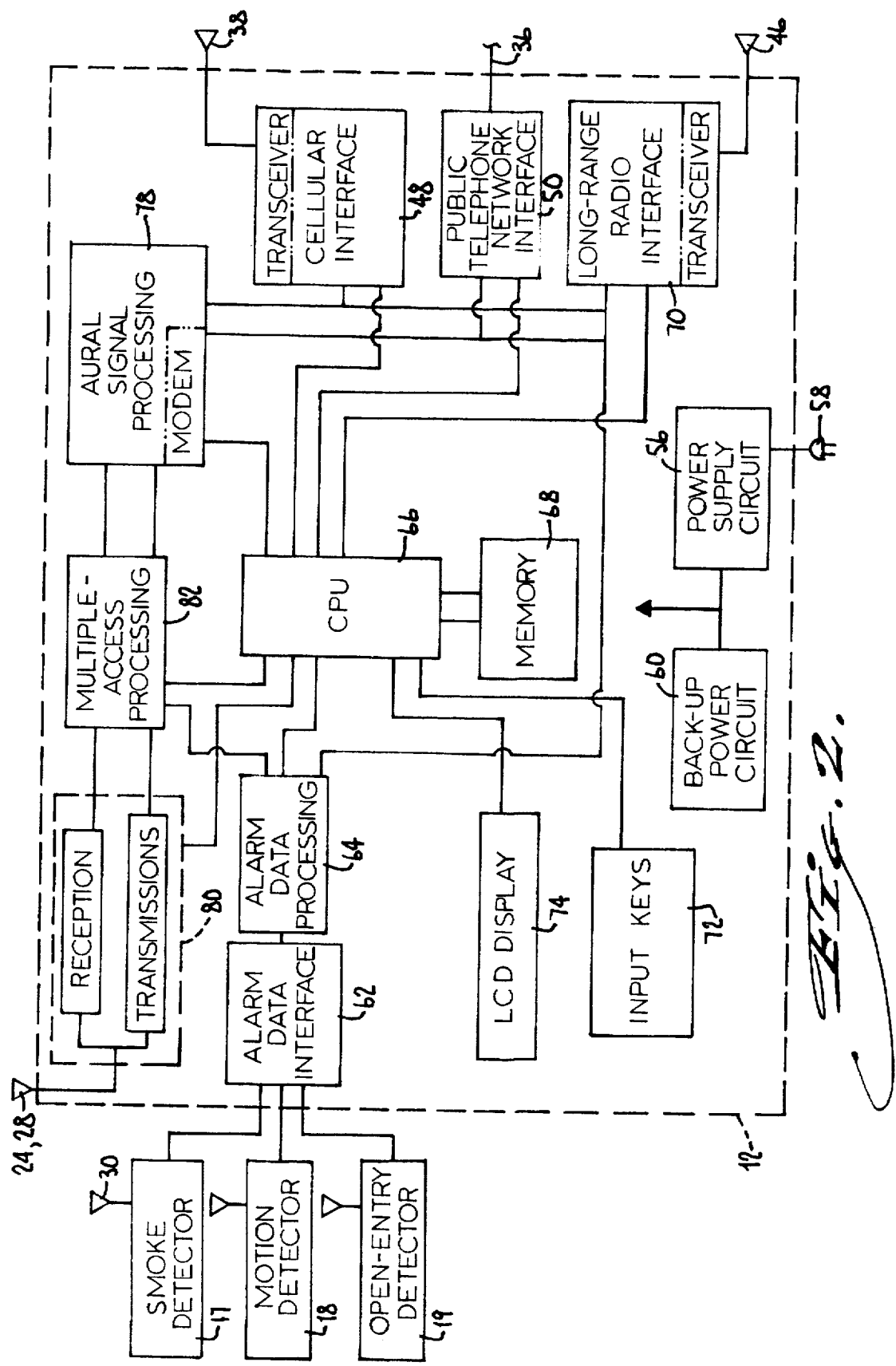

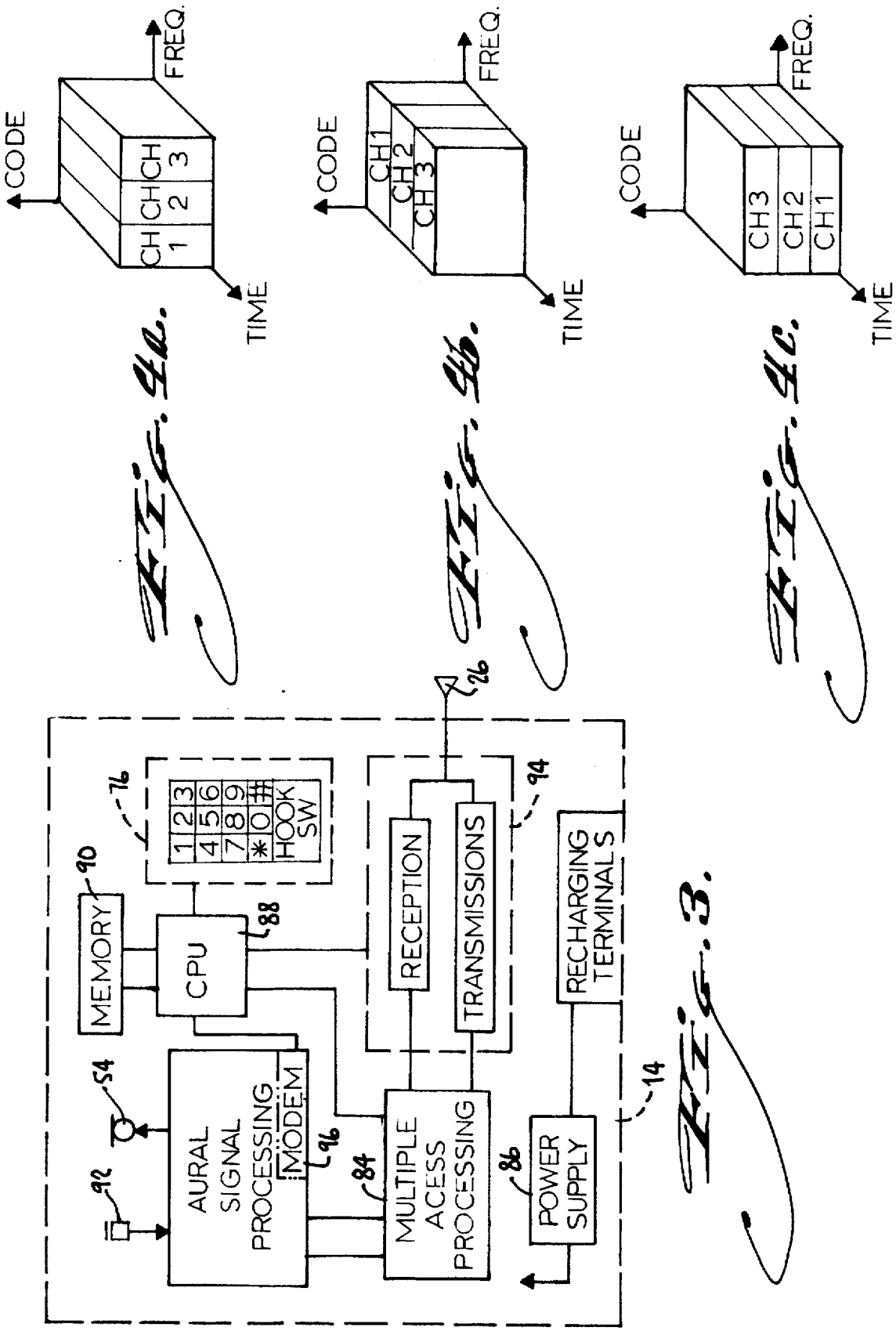

COMBINATION CORDLESS TELEPHONE AND PREMISE-MONITORING ALARM SYSTEM

BACKGROUND OF THE INVENTION

1. Field of the Invention

The invention relates to a combination cordless telephone and a premise-monitoring alarm system. More particularly, the invention concerns a base unit that combines the circuitry and components of a cordless telephone base unit, with the circuitry and components of an alarm system control panel. The base unit includes data, radio and/or telecommunication interfaces for establishing data, radio and/or telecommunication links with, among other objects, remote alarm sensors, a cordless telephone handset, and a public telephone network.

2. Prior Art

Prior art premise-monitoring alarm systems monitor a given premise—e.g., a home—for the occurrence of a given alarm event—e.g., an unwanted intrusion, or smoke. Upon detection of the given alarm event, the alarm system sends an appropriate message to a central alarm-monitoring station. The alarm system typically signals the central alarm-monitoring station via a public telephone network as either by a landline or a cellular link. The central alarm-monitoring station, which may be a public or private service, will have an attendant who can respond to the incoming alarm message by dispatching police or fire-fighters, as appropriate.

The prior art alarm systems generally comprise a control panel and several remote detectors. The control panel houses the control circuitry and the I/O or interface circuits/components, such as for example, telephone jacks, cellular transceivers, radio transponders and so on.

Prior art cordless telephones generally comprise a base unit and a cordless handset. The base unit is connected to the public telephone network via telephone jacks or perhaps even by a cellular transceiver. The base unit and handset communicate by radio. Until lately, typical cordless telephone technology has the base unit and handset communicating on AM bands. More currently, the signals sent from the base unit to the handset may be modulated in AM carrier bands, whereas the return signals—i.e., from the handset to base unit—may be modulated in FM carrier bands.

It would be a desirable improvement if there could be combined in one box (i) the base unit of a cordless telephone and (ii) the control panel of a premise-monitoring alarm system. When a cordless telephone's base unit is compared to an alarm system's control panel, there is much redundancy between the circuits that each has. There would be great economy in combining the two. Most or all redundancy could be eliminated. What is needed is a combination cordless telephone and a premise-monitoring alarm system which results in the utility of both, without detracting from the utility of either.

SUMMARY OF THE INVENTION

It is an object of the invention to combine a cordless telephone with a premise-monitoring alarm system.

It is an alternate object of the invention that the above combination have the cordless telephone's base unit and the alarm system's control panel combined into one package.

It is an additional object of the invention that most or all redundant circuits between cordless telephone's base unit and an alarm system's control panel be eliminated.

It is a another object of the invention that the above, combination cordless telephone and premise-monitoring alarm system be sufficiently easy to install for the average homeowner, for his or her convenience in equipping the home with an alarm system.

These and other aspects and objects are provided according to the invention in a combination cordless telephone and premise-monitoring alarm system. It has a base unit, a cordless handset, and one or more remote alarm detectors. The alarm detectors can be generally either smoke detectors, motion detectors, or open-entry detectors. One aspect of the invention relates to the circuitry of the base unit. Redundant circuits are eliminated.

What remains in the base unit are at least the following. There is one interface for the public telephone network, and another interface for radio communication with the cordless handset. The base unit might also communicate with the remote alarm sensors across the same radio interface. The base unit includes telephone call circuitry to relay telephone calls between a public telephone network and the handset. The base unit also includes alarm processing circuitry to send an alarm warning to a central alarm-monitoring station in response to an alarm signal from a remote detector.

The base unit has control circuitry that is configured such that if, during a telephone call, the base unit is given an alarm signal, the base unit will either (i) hang up the telephone call and call up the central alarm-monitoring station to give warning, or (ii) call up the central alarm-monitoring station on a second telephone line (if available).

Another inventive aspect in the base unit concerns multiple-access processing circuitry. The multiple-access processing circuitry is connected to form a three-way logical junction between the radio interface, the telephone call circuitry, and the alarm processing circuitry. The multiple-access processing circuitry functions to identify which radio signals are telephone call signals from the handset, as against which are alarm signals from the remote detectors. Then, after making identification, the multiple-access processing circuitry branches a given signal as appropriate.

Further inventive aspects include, among others, the following. The base unit can be configured to accept programming instructions (namely for alarm system functions) to be entered on the handset keypad. The base unit can also be arranged to generate and send a control signal to the handset to cause the handset speaker to sound a warning siren. The remote detectors, or at least, the smoke detector, can be given a speaker. And then, the remote speaker can be controlled by the base unit to sound a like warning siren. A number of additional features and objects will be apparent in connection with the following discussion of preferred embodiments and examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 2 is a schematic block diagram of the base unit of FIG. 1;

FIG. 3 is a schematic block diagram of the cordless handset of FIG. 1; and,

3

Figure 5:
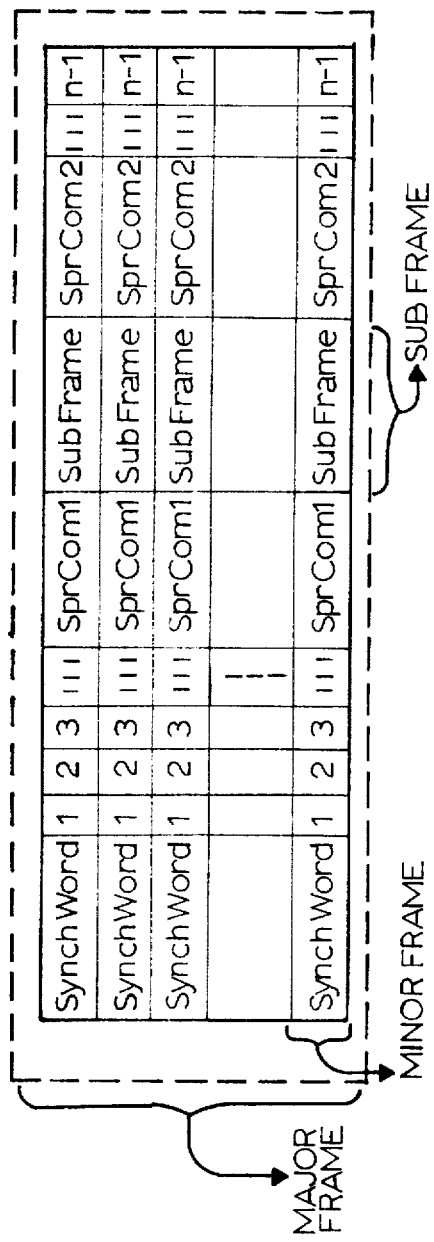
Figure 6:
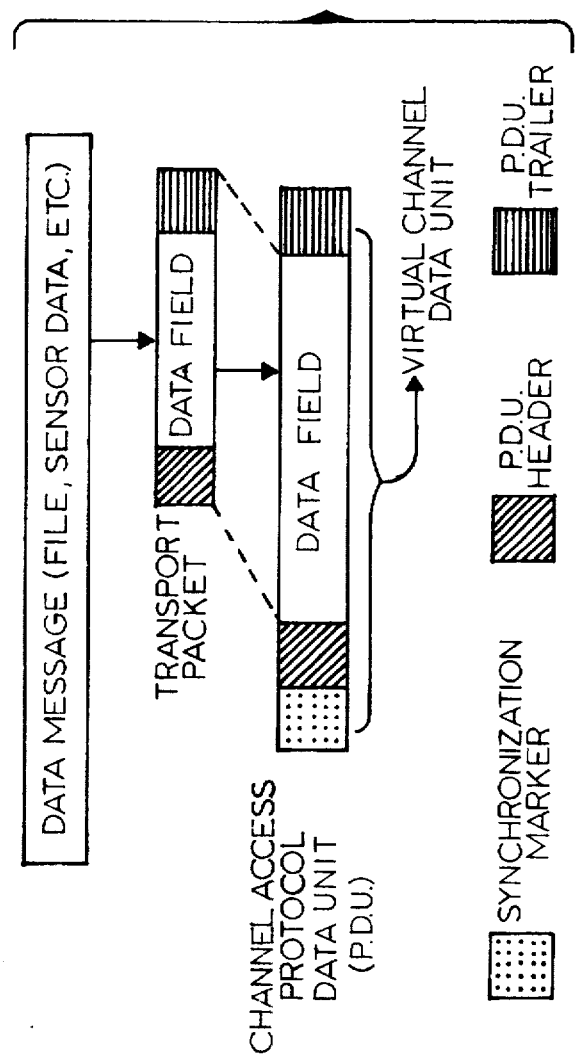

FIGS. 4A, 4B and 4C are time-frequency-code diagrams of analog data-transmission techniques (e.g., radio signalling), to show how multiple radio signals from multiple message sources can share a radio band of limited bandwidth with negligible interference levels, wherein:

FIG. 4A shows frequency-division multiple-accessing (FDMA),

FIG. 4B shows time-division multiple-accessing (TDMA), and,

FIG. 4C shows code-division multiple-accessing (CDMA); and,

FIGS. 5 and 6 are block diagrams of digital data-transmission techniques, to show how multiple digital data signals sent from or destined to multiple message sources can share a single data channel with negligible error levels, wherein:

FIG. 5 is a diagram illustrating digital data arranged in time-divided frames, as analogous to TDMA above (i.e., FIG. 4B); and, FIG. 6 is a diagram illustrating a digital data arranged in code-divided packets, as analogous to CDMA above (i.e., FIG. 4C).

DETAILED DESCRIPTION OF THE PREFERRED EMBODIMENTS

Figure 1:
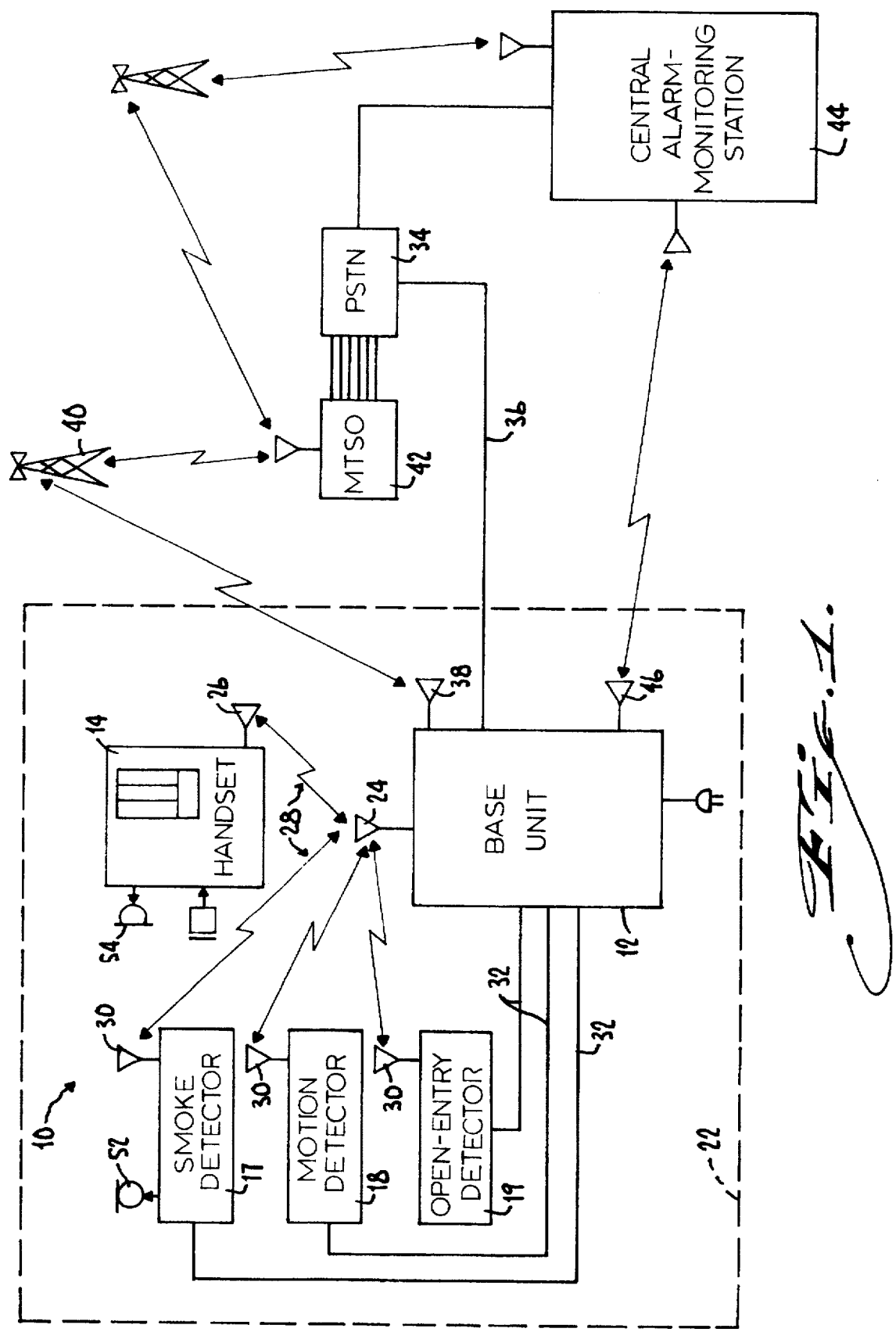
FIG. 1 is a schematic block diagram of a combination cordless telephone and premise-monitoring alarm system in accordance with the invention, wherein telecommunication networks and a central alarm-monitoring station are shown to disclose the operative environment of the invention.

FIG. 1 shows a combination cordless telephone and premise-monitoring alarm system 10 in accordance with the invention. It comprises a base unit 12, a cordless handset 14, and various alarm sensors such as a smoke detector 17, a motion detector 18, and an open-entry detector 19. A typical installation of the system 10 commonly uses more than one of each kind of detector on the given premise or property 22. The property 22 can be either a residential, commercial or institutional property.

The base unit 12 and handset 14 have antennas 24 and 26, respectively, to form a radio link 28. Typical cordless telephone technology usually broadcasts with full-duplex transmission in which, the channel(s) to convey signals sent from the base unit 12 is (are) called the forward channel(s), and, the channel(s) to convey signals destined to the base unit 12 is (are) called the reverse channel(s). It is known to use two sets of forward and reverse channels, wherein one set substantially carries control data as the other substantially carries message data. Until lately, typical cordless telephone technology usually modulated the message signals between the base unit and handset on AM carrier bands. More recently, it is becoming more common in the cordless telephone industry to modulate the forward channel(s) on AM carrier bands while modulating the reverse channel(s) on FM carrier bands. Other radio bands may be adopted by industry for standardization, but such changes would not detract from the advantages of the invention, as further explained below.

Each remote detector 17–19 includes an antenna 30 to gain access to the radio link 28 with the base unit 12. Additionally, each remote detector 17–19 may be connected to conductors 32 that extend to the base unit 12, which conductors 32 can serve as an alternative path for communication of data between the detectors 17–19 and base unit 12.

The base unit 12 is linked to a public switched telecommunications network (PSTN) 34 via either a directly connected landline 36, or else via a cellular link 38. The base unit 12 includes an antenna 38 for establishing the cellular link with the PSTN 34. A cellular path is shown extending from the base unit 12 to the nearest land-based, cellular antenna site 40, and then extending from that antenna site 40 to a mobile telephone switching office (MTSO) 42, which itself is directly connected to the PSTN 34.

In use, the remote detectors 17–19 generate data in response to a given alarm event. For example, the smoke detector 17 generates data upon detection of smoke, the motion detector 18 upon detection of motion, and the open-entry detector 19 upon detection of an open door or window, and so on. The data of the given alarm event is ultimately communicated to an attendant (not shown) at a central alarm-monitoring station 44. The communication path is shown to pass through the base unit 12 and branch from there onto at least three redundant paths, at least two of which extend through the PSTN 34, i.e., the landline 36 and the cellular link 38. The central alarm-monitoring station 44 may be operated by a public or private company. In practice, a service of the public or private company will include having the attendant call back the premise 22 which generated the alarm signal, to determine if a rightful occupant accidentally tripped the alarm. Otherwise, the attendant will dispatch police or fire-fighters as appropriate.

It is desirable if there are as many redundant paths of communication between the base unit 12 and the central alarm-monitoring station 44 as possible. That way, upon service failure of the PSTN 34, alarm signals will still reach the central alarm-monitoring station 44. For this purpose, the base unit 12 includes an antenna 46 for long-range radio communication with the central alarm-monitoring station 44. Other redundant paths are possible too and are known in the art.

It is further desirable if the cellular and the public telephone line interfaces 48 and 50, respectively (see FIG. 2), are two-line interfaces. That way, a telephone call won't block the transmission of an alarm message across the PSTN 34 because the telephone call can occupy the first line while the alarm message can go across the second. Otherwise, with a one-line interface, it is preferable if the base unit 12 is configured to act on an alarm message as follows: (1) hang up the telephone call, and (2) seize the single line for the higher priority purpose of sending the alarm message to the central alarm-monitoring station 44.

An inventive aspect of the remote detectors 17–19 involves the inclusion of speakers for emitting a loud siren. FIG. 1 shows the smoke detector 17 modified to include such a speaker 52. Whenever an alarm event is detected, the base unit 12 can control the speaker 52 to sound the siren. The siren would warn both rightful occupants and intruders alike. Likewise, the base unit 12 can control the speaker 54 of the handset 14 to sound a similar siren. It is supposed that the smoke detector 17 will likely be located in strategically central locations on the premise 22. It is also supposed that the handset 14 will be kept portably alongside one or more of the rightful occupants. For those reasons, it would be advantageous to get the handset 14 and smoke detector(s) 17 to sound a siren.

FIG. 2 shows further detail of the base unit 12. The base unit 12 is supplied power by the power supply circuit 56 via a line cord and plug 58 from public utility power (not illustrated). A battery backup circuit 60 provides reserve power to the base unit 12 during periods of power failure from the public utility power.

The base unit 12 includes an alarm data interface 62 and alarm data processing circuit 64. The alarm data interface 62 allows electrical connection for the conductors 32 from the alarm detectors 17–19. As previously said, the conductors 32 are a redundant path for carrying alarm data, as the other path—i.e., radio link 28—will be more fully described below. In use, a given detector 17-19 will generate a signal in response to a given alarm event. This signal is conveyed by the conductors 32 to the alarm data interface 62. The alarm data processing circuit 64 exchanges control data and telephone number information with a CPU 66 and its interconnected memory 68. More particularly, the CPU 66 and the alarm data processing circuit 64 co-process the alarm signal into an alarm message that includes an alarm code for the given alarm event, an account number for the given premise 22, and so on. Additionally, the CPU 66 and alarm data processing circuit 64 co-process the alarm message with control data such as the dialing instructions to dial and redial the central alarm monitoring station 44 (see FIG. 1) until answered, and the like. The output of the alarm data processing circuit 64 is connected to the public telephone line interface 50 for transmission of the alarm message to the central alarm-monitoring station 44 (FIG. 1). It is also desirable to provide redundant paths to send the alarm message from the base unit 12 to the central alarm-monitoring station 44. As shown by FIG. 2, the alarm message goes out through a cellular interface 48 and a long-range radio interface 70 as additional to the public telephone line interface 50. FIG. 1 shows the cellular and long-range radio paths to the central-alarm monitoring station 44.

The base unit includes input keys 72 and an LCD or like display 74 for entering and displaying program instructions such as, for example, toggling the alarm system between armed and disarmed states, or disarming a particular detector 17-19, and so on. An inventive aspect of the combination system 10 includes configuring the base unit 12's CPU 66 to accept information entered by the handset 14's keypad 76 (see FIG. 3) for programming the alarm system.

The telephone functions of the base unit 12 are processed in part by an aural signal processing circuit 78 that is connected between a transceiver circuit 80 and the interfaces 50 and 48 with the public telephone line and/or the cellular network, respectively. The transceiver circuit 80 is connected to antenna 24 which, as shown by FIG. 1, carries the radio traffic among the handset 14 and detectors 17-19. The CPU and memory 66 and 68 are connected to the aural signal processing circuit 78 to co-process message data (i.e., speech data) with control data such as to generate a dial tone or a busy signal, or to cause dialing, and so on. The purely telephonic functions of the combination system 10 are conventional and well-known.

An inventive aspect of the base unit 12 relates to a multiple-access processing circuit 82. It allows concurrent exchange of data among the base unit 12, handset 14 and detectors 17-19. An advantage of the multiple-access processing circuit 82 is that telephone use does not block the alarm detectors 17-19 from signalling the base unit 12.

In general terms, the multiple-access processing circuit 82 performs the following actions on incoming message signals. It divides the respective incoming message signals and identifies them in accordance with the respective message source thereof (i.e., whether that is the handset 14 or any of the detectors 17-19). After that, based upon the identification of the message source, the multiple-access processing circuit 82 logically branches each message signal as, for example, by switching the message signal for conduction to the appropriate processing circuit for that given message signal. Alternatively, the multiple-access processing circuit 82 may accomplish logical branching by the following steps: namely, signal the CPU 66 the identification of the message source for the given message signal, after which the CPU 66 will perform the appropriate processing on the message signal in accordance with programmed instructions that can be stored in memory 68.

For outgoing message signals, the multiple-access processing circuit 82 performs the following actions (in general terms only). It multiplexes and/or encodes diverse message signals destined for diverse message destinations (i.e., the handset 14 or the detectors 17-19) for concurrent transmission over the radio link 28. A given message destination divides out the appropriate message signal and blocks the rest, as described further below. There are naturally enough various techniques of multiple-access processing. Three techniques will be described below in reference to FIGS. 4 through 6. By way of background, some of the multiple-access processing techniques require that the message destination include a comparable multiple-access processing circuit.

Accordingly, FIG. 3 shows that the handset 14, as representative of the detectors 17-19 also, includes such a multiple-access processing circuit 84. More particularly, the handset 14 has a rechargeable power supply 86, a CPU 88 and memory 90 to control operations of the handset 14, the keypad 76 and speaker 54, and a microphone 92. The handset 14 also includes a transceiver circuit 94 and an aural-signal processing circuit 96.

If the optional multiple-access processing circuit 84 is excluded, then the handset 14 generally is conventional. The multiple-access processing circuit 84, however, allows the handset 14 to block radio traffic destined for the alarm detectors 17-19. Additionally, the multiple-access processing circuit 84 allows the handset 14 to co-process outgoing signals with a unique parameter. That unique parameter enables the base 12 unit to distinguish an incoming handset-signal from all other received signals.

The terminology "multiple-access," as used here, covers techniques that associate a given message signal with a unique parameter that is identifiable at the message destination. Multiple-accessing techniques allow a given radio link that is encumbered with limited channel resources, to carry much more traffic than is otherwise possible. A similar concept, "multiplexing," usually refers to the simultaneous transmission of multiple message signals through a single channel. Multiplexing, however, is commonly limited to when the multiple messages are combined at a central source. Multiple-access processing, while related to multiplexing, differs as shown by FIGS. 4A, 4B, and 4C.

FIGS. 4A, 4B and 4C are time-frequency-code diagrams that show how multiple radio signals can be carried on closely-spaced channels with negligible interference levels. These three figures show the three basic techniques of multiple-access transmission. Like multiplexing, multiple-access transmission involves the transmission of multiple messages across a limited radio bandwidth. Unlike multiplexing, multiple-access transmission allows each message source to access channel resources remotely and independently of the other sources. An example of a familiar industry that employs multiple-access communications is either the pager industry or the cellular telephone industry.

The most commonly used multiple-access techniques include frequency-division multiple access (FDMA) and time-division multiple access (TDMA), which divide a given radio band (i.e., Ch. 1, Ch. 2, and Ch. 3) on the basis of frequency and time, respectively. FIG. 4A graphically illustrates FDMA. In FDMA, separate message sources are allocated separate frequency bands (channels) for their exclusive use for the entire duration of a transmission. FIG. 4B graphically illustrates TDMA. In TDMA, several message sources share the same radio frequency but are assigned unique time slots (i.e., Ch. 1, Ch. 2, Ch. 3, etc.) in which they communicate.

An additional multiple-access technique is, code-division multiple-access (CDMA), as shown by FIG. 4C. In CDMA, every message source shares (i) the same radio frequency (ii) at the same time, but avoid interference because a unique code is associated with each message source. In the cellular telephone industry, a CDMA-based cellular system has been developed by Qualcomm, Inc., and is standardized by the Telecommunications Industry Association (TIA) as an interim standard "IS-95". The IS-95 standard supports a variable number of message sources in 1.25 MHZ wide bands. Whereas an FDMA system requires that the signal be at least 18 dB above interference to provide acceptable transmission quality, CDMA systems can operate with much larger interference levels because of their inherent interference-resistant properties. This fact allows a much greater message carrying capacity on a single band.

FIGS. 2 and 3, as previously described, show that the base unit and handset 12 and 14, respectively, include multiple-access processing circuits 82 and 84, respectively. However, in an FDMA system, the handset 14 does not necessarily require the multiple-access processing circuit 84. Instead, the handset 14 could be configured to communicate on a permanently assigned frequency, for which the transceiver circuit would be specifically tuned. On the other hand, the base unit 12, to work in that kind of an FDMA system, would still require its multiple-access processing circuit 82, both to divide the incoming signals according to frequency and to co-process the outgoing signals as well.

An alternative FDMA system invokes a "call-up" procedure whereby a dedicated frequency channel is assigned temporarily to a given telephone call at the instance of the call-up procedure. This given telephone call would have uninterrupted use of that particular dedicated frequency channel for the duration of this given telephone call, but upon the next telephone call, the call-up procedure would randomly access the first available frequency channel. Therefore, successive telephone calls could be accessing either a different or a same frequency channel, depending merely upon availability of an unused frequency channel. An advantage of FDMA systems is that there is long experience with them in the pager and cellular telephone industries.

Time-divided data is the traditional method for multiplexing multiple messages in a single data stream. The multiplexing structure is time repeating to allow for the message destination to synchronize to the repetition, or "commutation", rate of the data steam, as based on the contents of the data stream alone. FIG. 5 shows an arrangement of digital data in which multiple messages are time-divided and arranged in a so-call frame matrix. The particular frame format shown is a standard called "IRIG 106", developed by the military test ranges' Inter-Range Instrumentation Group (IRIG). However, this example frame format is used in industry too and not just by the military.

In FIG. 5, the frame matrix comprises a major frame, and the major frame has multiple minor frames. The major frame represents one complete cycle through the time-multiplexing sequence. During the cycle of the major frame, each message source is sampled at least once, but usually much more often than that. Each minor frame begins with a synchronization word. The columns of the matrix in the major frame can represent the message data of a given message source or, alternatively, the message data of several. In accordance with this format, the message data of a given message source is required to stay in its assigned column, always. However, the message data of a given message source can appear in each minor frame exactly once, more than once, or less, depending on circumstances as follows.

If message data from a given message source appears just once in each minor frame—for example, message source 3 in FIG. 5—then it is transmitted at the commutation rate for the system and it is called commutated data. If, on the other hand, message data from a given message source appears more than once, say twice, in each minor frame, then it is transmitted at a rate higher than commutation rate for the system and it is called supercommutated data. For example, the message data of message sources 1 and 2 in FIG. 5 represent supercommutated data because, in each minor frame, they appear once in columns 1 and 2, and then again in columns "sprcom 1" and "sprcom 2." Thus, supercommutated data occupies two or more slots (i.e., two or more columns) in each minor frame of the matrix.

The opposite of supercommuntated data is subcommutated data. In FIG. 5, one column labeled "subframe" represents the message data location for several message sources, and not just one. The message data of the several message sources appearing in the subframe column form the equivalent of data arranged in a vertically-aligned minor frame (of which there is not actually any). Put differently, the subframe provides comparable functions as any of the horizontally-aligned minor frames. That is, comparable to the allocation of locations in a minor frame, the message data of a given message source in the subframe can be allocated either one slot per subframe, or more than one. However, because date from a given message source in the subframe does not appear in every subframe location—from minor frame to minor frame—the data of that message source thereby arrives at the destination at a rate lower than the commutation rate. Such data is called subcommutated. With time-divided data, such formats are advantageous because they too are well-known in the art.

Code-divided formats are desirable for increased flexibility, because radio traffic from diverse sources can be handled in accordance with the natural activity of that source. FIG. 6 shows a code-divided format, which has digital data arranged in discrete packets. Packet systems have several advantages over frame systems. With packet systems, instead of having a master commutation rate, the communication activity of a given message source can be individualized to the natural activity of that source. The given message source simply sends or receives data only as needed.

As shown by FIG. 6, digital message data is organized, before transmission, into individual protocol data units (PDU). It is assumed that the message data exists as a relatively large block of data, at least of a size that is too large for transmission in a single packet. Therefore, the given block of data is organized first as a file, and then the overall data block or file is broken into manageable transport packets. At the destination, the block or file is reconstructed by an end-to-end piecing together of the packets. For actual 'transmission across the transmission channel, a channel packet can be used. The channel packet may multiplex several transport packets from several message sources together for efficient transport. It is common for the channel packets to be sent at regular intervals to maintain transmission synchronization. When this is done, fill packets are used to keep the channel active if there is no actual data to be sent. The packet header will then have a special code to indicate that the packet is a fill packet and thus there is no data to process.

The general packet format comprises a header that includes reconstruction and addressing information, and, following the header, message data. The packet may end with a trailer comprising error-checking codes or other administrative information. The addressing information in the packet includes both destination information as well as message-source identification. Other information included in the header might be a size parameter to specify the length of the data field. For processing at the destination, the channel packet usually begins with a synchronization marker, just like each time-divided minor frame in FIG. 5. Comparable synchronization processes can be deployed as are well known with frame-formatted systems.

With reference back to FIG. 2, the foregoing multiple-accessing techniques give the base unit 12 capabilities as follows. By way of background, it is desirable if the remote detectors 17–19 communicate with the base unit 12 over the radio link 28 because, the radio link 28 eliminates the need for the conductors 32. That way, a homeowner could install the system 10 more easily. The homeowner would not have to hang conductors around his or her house to connect up the remote detectors 17–19. Although FIG. 2 does illustrate conductors 32, the conductors 32 are a redundant communication path only, and could be optionally eliminated from the combination system 10 without detracting from its the operative capabilities.

Thus, it is desirable if the radio link 28 carries all the radio traffic among the base unit 12, the remote detectors 17–19, and the handset 14. The above multiple-accessing techniques address the situation that occurs when both the handset 14 and one or more of the remote detectors 17–19 are actively accessing the radio link 28 concurrently. What multiple-access processing does is, to co-process a given message signal at the message source with a unique parameter so that at the message destination, the given message signal can be divided out from among all the other message traffic on the radio link 28. After that, the given message signal is identified and then logically branched for appropriate processing by the appropriate processing circuitry.

For example, if the base unit 12 should receive a message from the smoke detector 17 mixed in with other concurrently-received messages, the multiple-access processing circuitry 82 would divide out the various messages, identify and associate a given message source with each given message, and then logically branch the smoke detector message for alarm message processing as is appropriate. In FIG. 2, as the base unit 12 is configured, the multiple-access processing circuit 82 would perform switching operations such that the smoke detector message would be routed to the alarm data processing circuit 64 for processing there. Alternative configurations of the base unit 12 can be easily devised by a person having ordinary skill in the art to accomplish generally the same result. For instance, the multiple-access processing circuit 82 could be configured to forward all incoming message traffic to the CPU 66 for processing there. The CPU 66 would perform the appropriate processing operations on a given message signal in accordance with the message-source identification performed by the multiple-access processing circuitry 82. The CPU 66 would successively process the successively arriving messages from the diverse message sources in accordance with the appropriate algorithms or programmed instructions that may reside memory 68. Other arrangements of handling and processing the messages are possible too. The CPU 66 can be configured to handle the multiple-access algorithms in place of the multiple-access processing circuitry 82. Also, the processing capabilities of the CPU 66 can be expanded for parallel processing as is well known.

To return to the description of multiple-access processing for a smoke detector, message, that last example, in reverse, would operate as follows. if consideration is given to an instance when the base unit 12 generates and sends data to the smoke detector 17 (i.e., enables the speaker 52's siren). To consider first the handset 14 (to return to FIG. 3), its transceiver circuit 94 presumptively will pick up the smoke detector-destined signal. However, the handset 14's multiple-access processing circuit 84 blocks this particular signal because it is destined for the smoke detector 17 and not the handset 14. The multiple-access processing circuit 84 is configured to key upon a unique parameter associated with the signal which can be, as previously said, a parameter of frequency, time, or code. Thus the handset 14's multiple-access processing circuit 84 blocks the smoke detector-destined signal because it either arrives on the wrong frequency (i.e., an FDMA system as shown by FIG. 4A), or it arrives in the wrong time slot in a frame matrix (i.e., a time-divided system as shown by FIGS. 4B and/or 5), or else, it arrives with the wrong code in a packet header (i.e., a code-divided system as shown by FIGS. 4C and/or 6).

It is also possible to configure a hybrid multiple-accessing format from combinations of the above three. For example, the handset 14's message traffic could be frequency-divided from the detectors 17–19's message traffic, wherein the message traffic of the detectors 17–19 is allocated just a single frequency channel for which each detector 17–19 competes for access thereto. Then, the massage traffic among the detectors 17–19 (but not the handset 14) could be either time-divided or code-divided.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A combination cordless telephone and premise-monitoring alarm system, the combination comprising:

a base unit, a cordless handset, and, at least one remote sensor for generating data in response to a given alarm event;

the base unit including a telecommunications interface for establishing a telecommunications link with a public switched telecommunications network (PSTN), a radio interface for establishing a radio link with the handset, a data interface for establishing a data link with the remote sensor, and, processor circuitry for processing intercommunication of control and message data among the interfaces;

the handset including a radio interface, a keypad, a speaker, a microphone, and processing circuitry for processing intercommunication of control and message data among the radio interface thereof, the keypad, the speaker and the microphone;

the remote sensor including means for completing the data link between the remote sensor and the base unit;

wherein the processing circuitry of the base unit further processes alarm system functions such as monitoring the data link for data of the given alarm event and, in response thereto, transmitting control and message data via the telecommunications interface to a central alarm-monitoring station.

2. The combination of claim 1 wherein the processing circuitry of the base unit further processes instructions entered through the keypad of the handset, to enable a user to program given alarm system functions.

3. The combination of claim 2 wherein the given alarm system functions that can be entered through use of the handset keypad include toggling between armed and disarmed states of operation.

4. The combination of claim 1 wherein the processing circuitry of the base unit is further configured to generate and send a control signal to the handset to cause the speaker of the handset to emit a warning siren.

5. The combination of claim 4 wherein the remote sensor includes a speaker which can emit another warning siren in response to commands received from the base unit.

6. The combination of claim 1 wherein the at least one remote sensor is chosen from one of a smoke detector, a motion detector, and an open-entry detector.

7. The combination of claim 1 wherein the means of the remote sensor for completing the data link comprises one of conductor and a radio link.

8. The combination of claim 1 wherein the telecommunications interface comprises one of a land-line interface and a cellular interface to the PSTN.

9. A combination cordless telephone and premise-monitoring alarm system, the combination comprising:
 a base unit;
 a cordless handset; and,
 at least one remote alarm sensor;
 the base unit including a telecommunications interface for establishing a telecommunications link with a public switched telecommunications network (PSTN), a radio interface for establishing a radio link with the handset and the remote sensor, and, processing circuitry for processing intercommunication of control and message data between the telecommunication and radio interfaces;
 the handset including a radio interface, a keypad, a speaker, a microphone and processing circuitry for processing intercommunication of control and message data among the radio interface thereof, the keypad, the speaker and the microphone;
 the remote alarm sensor including a radio interface and means for (i) generating data in response to a given alarm event and (ii) transmitting the data of the given alarm event across the radio link to the base unit;
 wherein the processing circuitry of the base unit co-processes sensor data and handset data to allow concurrent use of the radio link among the base unit, handset and remote sensor so that traffic on the radio link between the handset and the base unit does not block traffic between remote sensor and the handset.

10. The combination of claim 9 wherein the processing circuitry of the base unit further processes instructions entered through the keypad of the handset, to enable a user to program given alarm system functions.

11. The combination of claim 10 wherein the given alarm system functions that can be entered through the handset keypad include toggling between armed and disarmed states of operation.

12. The combination of claim 9 wherein the processing circuitry of the base unit co-processes sensor data and handset data in accordance with a given multiple-access processing techniques chosen from frequency-divided multiple accessing, time-divided multiple accessing, code-divided multiple accessing, and combinations thereof.

13. The combination of claim 9 wherein the processing circuitry the base unit is further configured to generate and send a control signal to the handset to cause the speaker of the handset to emit a warning siren.

14. The combination of claim 13 wherein the remote sensor includes a speaker which can emit another warning siren in response to commands received from the base unit.

15. The combination of claim 9 wherein the at least one remote sensor is chosen from one of a smoke detector, a motion detector, and an open-entry detector.

16. The combination of claim 11 wherein the telecommunications interface comprises one of a land-line interface and a cellular interface to the PSTN, at least to permit intercommunication of data with a central alarm-monitoring station.

17. A base unit for a combination cordless telephone and alarm system, the base unit comprising:
 an interface for a public switched telecommunications network (PSTN);
 a radio interface for forming a radio link among a cordless handset and a remote alarm sensor;
 aural-signal processing circuitry connected between the radio and PSTN interfaces to process telephone call message and control data;
 alarm data processing circuitry connected between the radio and PSTN interfaces to process alarm message and control data;
 wherein, during a telephone call, when the alarm data processing circuitry receives a message of the occurrence of given alarm event from the remote alarm sensor, the alarm data processing circuitry is configured to issue a given set of instructions to the PSTN interface chosen from (i) a set of instructions which cause interruption of the telephone call and then transmission of a message to a central alarm-monitoring station, and, (ii) a set of instructions which cause transmission of a message to the central alarm-monitoring station over a PSTN path other than a PSTN path used by the telephone call.

18. The base unit claim 17 further comprising:
 multiple-access processing circuitry, connected to form a logical branch between the radio interface, the aural-signal processing circuitry, and the alarm data processing circuitry,
 wherein, the multiple-access processing circuitry is configured to process a given incoming signal over the radio link, such as to determine an identity of a message source for the given incoming signal chosen from the cordless handset and the remote alarm sensor, and then to perform a logical branching of the given incoming signal on the basis of identity, so that the given message signal is appropriately processed by one of the aural-signal processing circuitry and the alarm data processing circuitry, respectively.

19. The base unit of claim 18 wherein the multiple-access processing circuitry is configured to operate in accordance with a given multiple-access processing technique chosen from frequency-divided multiple accessing, time-divided multiple accessing, and code-divided multiple accessing.

* * * * *